United States Patent [19]

Simonds et al.

[11] Patent Number: 5,339,378
[45] Date of Patent: Aug. 16, 1994

[54] TORQUE-BALANCED EXTENDABLE FIBER OPTIC CABLE

[75] Inventors: Gregory A. Simonds, Old Lyme; Louis E. Sansone, Brooklyn, both of Conn.

[73] Assignee: The United States of America as represented by the Secretary of the Navy, Washington, D.C.

[21] Appl. No.: 134,192

[22] Filed: Oct. 6, 1993

[51] Int. Cl.$^5$ .................................................. G02B 6/44
[52] U.S. Cl. .................................... 385/100; 385/102; 385/109; 385/114
[58] Field of Search ............... 385/100, 101, 102, 103, 385/104, 105, 106, 107, 108, 109, 110, 111, 112, 113, 114

[56] References Cited

U.S. PATENT DOCUMENTS

| | | | |
|---|---|---|---|
| 3,817,595 | 6/1974 | Edelman et al. | 385/111 |
| 3,955,878 | 5/1976 | Nowak | 385/111 |
| 4,146,302 | 3/1979 | Jachimowicz | 385/111 |
| 4,379,409 | 4/1983 | Primbsch et al. | 385/100 |
| 4,468,088 | 8/1984 | van der Hoek | 385/111 |
| 4,632,506 | 12/1986 | Taylor | 385/114 |
| 4,772,090 | 9/1988 | Atkins et al. | 385/101 |
| 4,846,566 | 7/1989 | Barnett et al. | 385/110 |
| 4,852,964 | 8/1989 | Holland et al. | 385/111 |
| 4,873,030 | 10/1989 | Taketani et al. | 264/1.5 |
| 4,881,795 | 11/1989 | Cooper | 385/104 |
| 5,018,825 | 5/1991 | Rowland | 385/100 |
| 5,121,458 | 6/1992 | Nilsson et al. | 385/100 |

Primary Examiner—Frank Gonzalez
Attorney, Agent, or Firm—Michael J. McGowan; Prithvi C. Lall; Michael F. Oglo

[57] ABSTRACT

An extendable fiber optic cable includes an inner tubular core, a viscous gel received in the tubular core, a plurality of optical fibers suspended in the gel, reinforcing fibers which are braided around the inner core, and an elastomeric outer cover which is received over the reinforcing fibers. The cable is first formed in a straight configuration and then formed into a plurality of coiled segments wherein adjacent coiled segments are wound in alternating directions, i.e. clockwise, counterclockwise, clockwise, etc. Straight segments of wire are provided between the coiled segments wherein the cable is stretchable up to 50% of its relaxed length. The alternating coil segments prevent the cable from twisting and transmitting torque forces to the optical fibers.

8 Claims, 1 Drawing Sheet

TORQUE-BALANCED EXTENDABLE FIBER
OPTIC CABLE

STATEMENT OF GOVERNMENT INTEREST

The invention described herein may be manufactured and used by or for the Government of the United States of America for governmental purposes without payment of any royalties thereon or therefor.

BACKGROUND OF THE INVENTION (1) Field of the Invention

The instant invention relates to extendable fiber optic cables, and more particularly to a torque-balanced extendable fiber optic cable.

(2) Description of the Prior Art

It is well known in the art that fiber optic transmission cables are utilized in towed array sonar systems to transmit data from an underwater sonar sensor to a ship or other vehicle while the sensor is towed through the water by the ship or vehicle. It has been found that when the fiber optic cable is towed through the water, the cable is subjected to very high tensile forces which stretch the optical fibers located within the cable, and tend to degrade the quality of transmission through these optic fibers. In this regard, extendable or stretchable fiber optic cable designs have heretofore been known in the art. These extendable cables are operative for decreasing the tensile forces applied to the optical fibers in order to increase the quality of transmission.

The U.S. patents to Nowak U.S. Pat. No. 3,955,878; Jachimowicz U.S. Pat. No. 4,146,302; van der Hock U.S. Pat. No. 4,468,088; Holland et al U.S. Pat. No. 4,852,964; and Taketani et al U.S. Pat. No. 4,873,030 disclose cable structures which represent the closest prior art to the subject invention of which the applicant is aware. The patent to Nowak discloses a fiber optic transmission line having helically wound optical fibers which are positioned lengthwise within a flexible tubing. The fibers are separated from each other and suspended within the flexible tubing by means of a semi-liquid gel which lubricates and insulates the fibers from the cable structure.

The patent to Jachimowicz discloses a flexible fiber optic cable in which optic fibers are formed into an elongated strip and then the strip is coiled into a helix to allow bending and stretching motion without disruption of the optical transmission.

The patent to van der Hock discloses a flexible optical fiber transmission cable wherein a plurality of fibers extend therethrough in alternating left and right hand helixes.

The patent to Holland et al discloses a fiber optic cable assembly which is helically wound about a mandrel and heat set to retain its coil shape. The resulting coil shape provides a stretchable optical cable assembly.

The patent to Taketani et al discloses another method of molding a fiber optic transmission cable into a coil.

These prior art cable constructions are known to have several disadvantages. Firstly, the prior art cable constructions only allow a minimal degree of stretching before optical transmission is compromised. Further, although the prior art coiled cable structures are known to reduce axial or tensile stresses on the optical fibers, they also increase twisting or torque stresses to the optic fibers.

SUMMARY OF THE INVENTION

The instant invention provides a torque-balanced, extendable fiber optic cable. The instant fiber optic cable includes a rigid, yet bendable tubular core element, a viscous gel received in the core element, and a plurality of optic fibers suspended in the gel. The cable further includes a layer of reinforcing fibers which are braided around the core element, and an elastomeric outer jacket which is extruded over the reenforcing fibers. After the cable is initially formed in a straight configuration, it is wound to form a helix in alternating directions with straight segments of cable disposed between adjacent helical segments. An optimum helix pitch is chosen by a mathematical formula to reduce bend loss or degradation of the optic fiber signal. The alternating helixed segments balance twisting or torque forces which are normally encountered when extending unidirectionally coiled cable. The combination of reinforcing fibers and alternating coiled segments therefore significantly reduce stress on the optical fibers while enabling the cable to be extended or stretched up to 50% of its relaxed length.

Accordingly, it is an object of the instant invention to provide an extendable fiber optic cable.

It is another object to provide an extendable fiber optic cable which can stretch up to 50% or more of its relaxed length.

It is yet another object to provide an extendable torque-balanced fiber optic cable which does not overstress the optical fibers and degrade transmission characteristics of the cable.

It is still another object to provide a torque balanced extendable fiber optic cable having a plurality of coil segments which are wound in alternating directions.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DESCRIPTION OF THE PREFERRED EMBODIMENT

Figure 1:
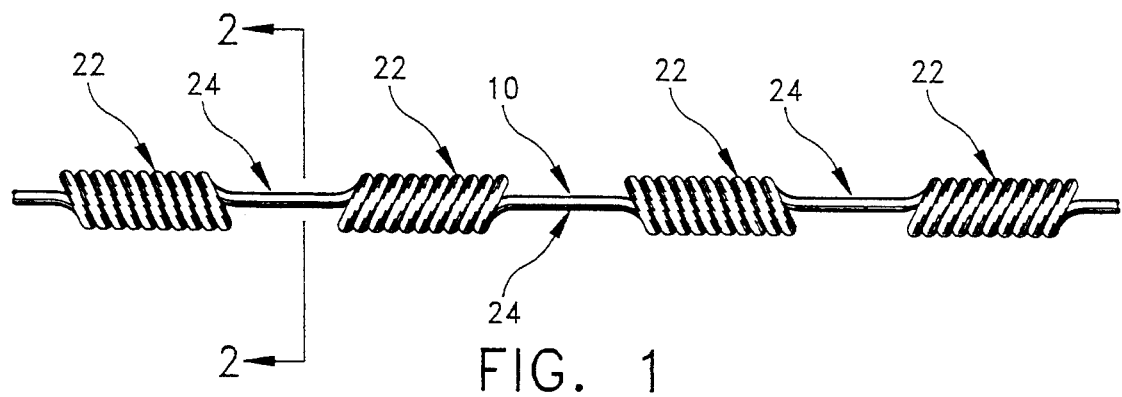
FIG. 1 is a side-elevational view of the torque-balanced, extendable fiber optic cable of the instant invention.
Figure 2:
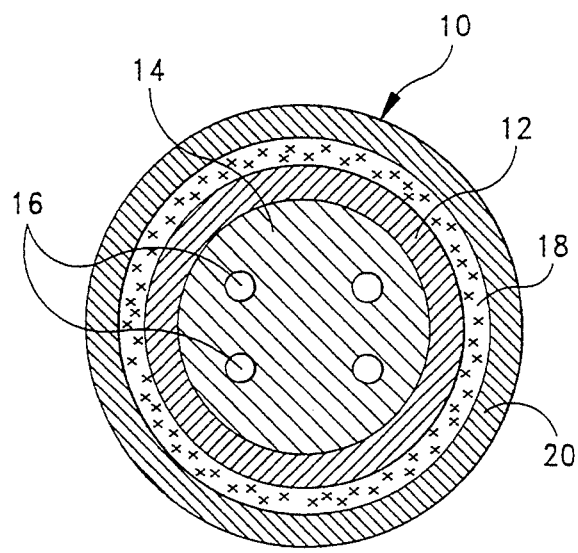
FIG. 2 is an enlarged cross-sectional view thereof taken along line 2—2 of FIG. 1.
Figure 3:
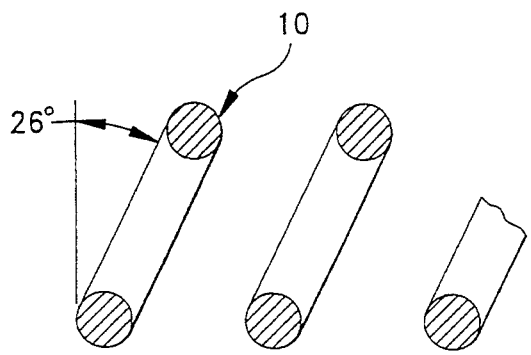
FIG. 3 is an enlarged elevational view of one of the coil segments showing the coil pitch thereof.

Referring now to the drawings, the torque-balanced fiber optic cable of the instant invention is illustrated and indicated at 10 in FIGS. 1-3. As will hereinafter be more fully described, cable 10 is operative for stretching up to 50% of its relaxed length without over-stressing the cable structure and degrading the optical transmission characteristics of the cable.

Referring now to FIGS. 1 and 2, fiber optic cable 10 comprises a tubular core element 12, a viscous gel 14 having a viscosity in a range from 0.001 to 10 m²/s which is received in and completely fills core element 12, a plurality of optical fibers 16 which are suspended within gel 14, a plurality of reinforcing fibers 18 which are disposed around core element 12, and an outer jacket 20 covering fibers 18.

Tubular core element 12 preferably comprises a rigid, yet bendable plastic tubing, such as nylon tubing. Core element 12 is preferably rigid enough so that it cannot be compressed, yet flexible enough so that it can be wound into a coil shape. Tubular core element 12 is designed to accommodate a plurality of optical fibers 16 which extend longitudinally through the length of core element 12. In this regard, optical fibers 16 preferably comprises bend insensitive optical fibers, such as AC-CUTETHER (Registered Trademark of AT&T) or PAYOUT (Registered Trademark of Corning) optical fibers. A color code is preferably applied to optic fibers 16 to facilitate identification thereof.

The void between optic fibers 16 and the inner surface of core element 12 is filled with a thick, viscous gel 14 which provides lubrication between all surfaces. Gel 14 also serves to isolate optic fibers 16 from cable induced vibrations, and to act as a water blocking agent which prevents water penetration and a subsequent degradation of optical fibers 16.

Reinforcing fibers 18 preferably comprise aramid based fibers, glass based fibers, steel based fibers, or other similar fibers having a high Young's Modulus (to 300 GPa), and they are preferably braided around the outer surface of core element 12 before outer jacket 20 is applied. Alternatively, reinforcing fibers 18 could be unidirectionally coiled, contra-helically coiled or straight. Still further, reinforcing fibers 18 could be pulled straight and co-extruded within core element 12 or within outer jacket 20. Reinforcing fibers 18 act as strength members within cable 10 and are effective for transferring axial tension to core element 12 and or outer jacket 20 without stressing optical fibers 16.

Outer jacket 20 preferably comprises an elastomeric plastic, such as Suryln or polyurethane, and it is applied over reinforcing fibers 18 using conventional extrusion techniques. Outer jacket 20 provides a protective cover, and it also serves as a strength member to maintain the coil shape of cable 10.

Cable 10 is first formed in a straight configuration, and then coiled to form a plurality of coiled segments which are generally indicated at 22 in FIG. 1. In this regard, cable 10 is preferably coiled in alternating directions with straight segments of cable generally indicated at 24 disposed between adjacent coil segments 22. Alternating coiled segments 22 as illustrated in FIG. 1, enable cable 10 to extend or stretch up to 50% of its relaxed length without over-stressing optical fibers 16. Straight cable segments 24 reduce manufacturing costs, but could be reduced in length or eliminated if additional stretching of cable 10 is required. Coiled segments 22 are formed by winding cable 10 around a mandrel, and then heating, tempering or irradiating the cable 10 so that the coil shape is permanently maintained. The alternating helix structure of cable 10 prevents cable 10 from excessively twisting, i.e., balances the unidirectional torque forces normally encountered when stretching a unidirectionally coiled cable.

It is well known that coiling cable 10 creates bendloss, i.e., degradation of the transmission quality of optic fibers 16. Bendloss within the instant cable construction 10 is minimized by selecting an optimum coil pitch angle ($\Phi$) based upon the following formula:

$$\Phi = \arctan\left[1 + \left(\frac{\pi D_{BEND}}{D_{MINIMAL.PITCH}}\right)^{-2}\right] \quad (1)$$

wherein $D_{bend}$ is the minimum bend diameter of acceptable optical loss, and $D_{minimal\ pitch}$ is the minimal pitch distance based upon the following formula:

$$D_{MINIMAL.PITCH} = \sqrt{[\pi D_{BEND}]^2 - [\pi(D_{TUBE} - D_{CABLE})]^2} \quad (2)$$

wherein $D_{tube}$ is the outside diameter of the coil and $D_{cable}$ is the diameter of cable 10. In the instant embodiment, the pitch angle is calculated to be 26 degrees, as illustrated in FIG. 3.

It is seen therefore that the instant invention provides an effective torque-balanced, extendable fiber optic cable 10. The cable construction 10 effectively stretches up to 50% of its relaxed diameter without over-stressing optical fibers 16, and alternating coil segments 22 prevent twisting of cable 10, i.e., balances torque forces, which are normally encountered with a unidirectionally wound cable. The coil shape is permanently formed and therefore allows cable 10 to elastically recover to its original shape when not loaded in tension. The use of a bend insensitive optic fiber 16 and the selection of an optimum pitch angle effectively reduces bendloss and degradation of optical transmission characteristics of optic fibers 16. The use of dual jacket construction 12 and 20 respectively, and reinforcing fibers further reduces stress on optic fibers 16, and also facilitates termination of cable 10 at its end points.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An extendable fiber optic cable comprising:
   a rigid, yet bendable tubular core;
   a viscous gel completely filling said tubular core for providing lubrication;
   a plurality of optical fibers, extending through said core and suspended in said gel;
   fiber reinforcement means, disposed around said tubular core for providing reinforcement; and
   an elastomeric outer jacket disposed over said reinforcement means, for providing a protective cover for said cable;
   said cable having a plurality of permanently formed coiled segments which are coiled in alternating directions.

2. The cable of claim 1 further including straight cable segments disposed between adjacent coiled segments.

3. In the cable of claim 1, said coil segments having a coil pitch of about 26 degrees.

4. In the cable of claim 1, said tubular core comprising a plastic tube.

5. In the cable of claim 1, said tubular element comprising a nylon polymer tube.

6. In the cable of claim 1, said fiber reinforcement means comprising fibers having a high Young's Modulus.

7. In the cable of claim 1, said fiber reinforcement means being braided around said core element.

8. In the cable of claim 1, said optic fibers comprising bend insensitive optic fibers.

* * * * *